United States Patent
Wang et al.

(10) Patent No.: US 11,100,896 B1
(45) Date of Patent: Aug. 24, 2021

(54) LIQUID-CRYSTAL DISPLAY COMBINED WITH LED STRIP AND DISPLAY METHOD THEREOF

(71) Applicant: Wistron Corp., New Taipei (TW)

(72) Inventors: Sheng-Hung Wang, New Taipei (TW); Pei-Kai Hsu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/897,453

(22) Filed: Jun. 10, 2020

(30) Foreign Application Priority Data

Apr. 1, 2020 (TW) .................................. 109111140

(51) Int. Cl.
| | |
|---|---|
| *G09G 5/14* | (2006.01) |
| *G09G 3/36* | (2006.01) |
| *G09G 5/12* | (2006.01) |
| *G09G 3/32* | (2016.01) |

(52) U.S. Cl.
CPC ............... *G09G 5/14* (2013.01); *G09G 3/32* (2013.01); *G09G 3/36* (2013.01); *G09G 5/12* (2013.01); *G09G 2300/026* (2013.01); *G09G 2310/0243* (2013.01); *G09G 2360/04* (2013.01)

(58) Field of Classification Search
CPC ....... G06F 3/1446; G06F 3/1423; G09G 5/14; G09G 5/12; G09G 2300/026; G09G 2310/0232; G09G 2360/04; G09G 3/36; G09G 2310/0243; G02F 1/13336
See application file for complete search history.

(56) References Cited

U.S. PATENT DOCUMENTS

| 2014/0184472 A1* | 7/2014 | Xia ................. G06F 3/1446 345/1.3 |
| 2014/0198251 A1* | 7/2014 | Li .................... H04N 9/12 348/453 |
| 2018/0173036 A1* | 6/2018 | Kim ................. G09G 3/3406 |

FOREIGN PATENT DOCUMENTS

| CN | 102339565 A | 2/2012 |
| CN | 102708840 A | 10/2012 |
| CN | 107886852 A | 4/2018 |

OTHER PUBLICATIONS

Chinese language office action dated Feb. 18, 2021, issued in application No. TW 109111140.

* cited by examiner

*Primary Examiner* — Xuemei Zheng
(74) *Attorney, Agent, or Firm* — McClure, Qualey & Rodack, LLP (57) ABSTRACT

A display device includes a plurality of LCD displays, a plurality of LED strips, an image splitter, an image extractor, and a driving circuit. Each of the LCD displays displays corresponding split data. The LED strips are disposed among the LCD displays. Each of the LED strips displays patch data according to a corresponding driving signal. The LCD displays and the LED strips form a display wall to display image data. The image splitter splits the image data to generate the split data. The screen extractor generates the patch data according to the image data. The driving circuit generates the driving signals according to the patch data.

10 Claims, 7 Drawing Sheets

LIQUID-CRYSTAL DISPLAY COMBINED WITH LED STRIP AND DISPLAY METHOD THEREOF

CROSS REFERENCE TO RELATED APPLICATIONS

This Application claims priority of Taiwan Patent Application No. 109111140, filed on Apr. 1, 2020, the entirety of which is incorporated by reference herein.

BACKGROUND OF THE INVENTION

Field of the Invention

The disclosure relates generally to display devices and display methods thereof, and more particularly it relates to display devices of a liquid-crystal display combined with LED strips and display methods thereof.

Description of the Related Art

Large commercial electronic billboards and large TV walls that are available on the market can usually be divided into two types: one combines a plurality of liquid-crystal displays, and the other combines a plurality of LEDs. Since current liquid-crystal displays still cannot be made in such a way that they are frameless, the technique of combining a plurality of liquid-crystal displays may cause the problem of black frames due to the frames of the liquid-crystal displays.

However, although the problem of black frames can be overcome by the way of combining a plurality of LEDs, the cost and power consumption of the way of combining a plurality of LEDs are much more than that of combining a plurality of liquid-crystal displays. Therefore, it is necessary to solve the problem of black frames on the TV wall caused by the combining of a plurality of liquid-crystal displays.

BRIEF SUMMARY OF THE INVENTION

In an embodiment, a display device includes a plurality of liquid-crystal displays, a plurality of LED strips, an image splitter, an image extractor, and a driving circuit. Each of the liquid-crystal displays displays corresponding split data. The LED strips are disposed among the liquid-crystal displays. Each of the LED strips displays patch data according to a corresponding driving signal. The liquid-crystal displays and the LED strips form a TV wall, and the TV wall displays image data. The image splitter splits the image data to generate the split data. The image extractor generates the patch data according to the image data. The driving circuit generates the driving signals according to the patch data.

In an embodiment, a display method, which is adapted to a TV wall, is provided. The TV wall is formed by a plurality of liquid-crystal displays and a plurality of LED strips. The LED strips are disposed among the liquid-crystal displays. The display method includes receiving image data; splitting the image data to generate split data; displaying the corresponding split data on the liquid-crystal displays; generating the patch data according to the image data; and displaying the patch data on the LED strips.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
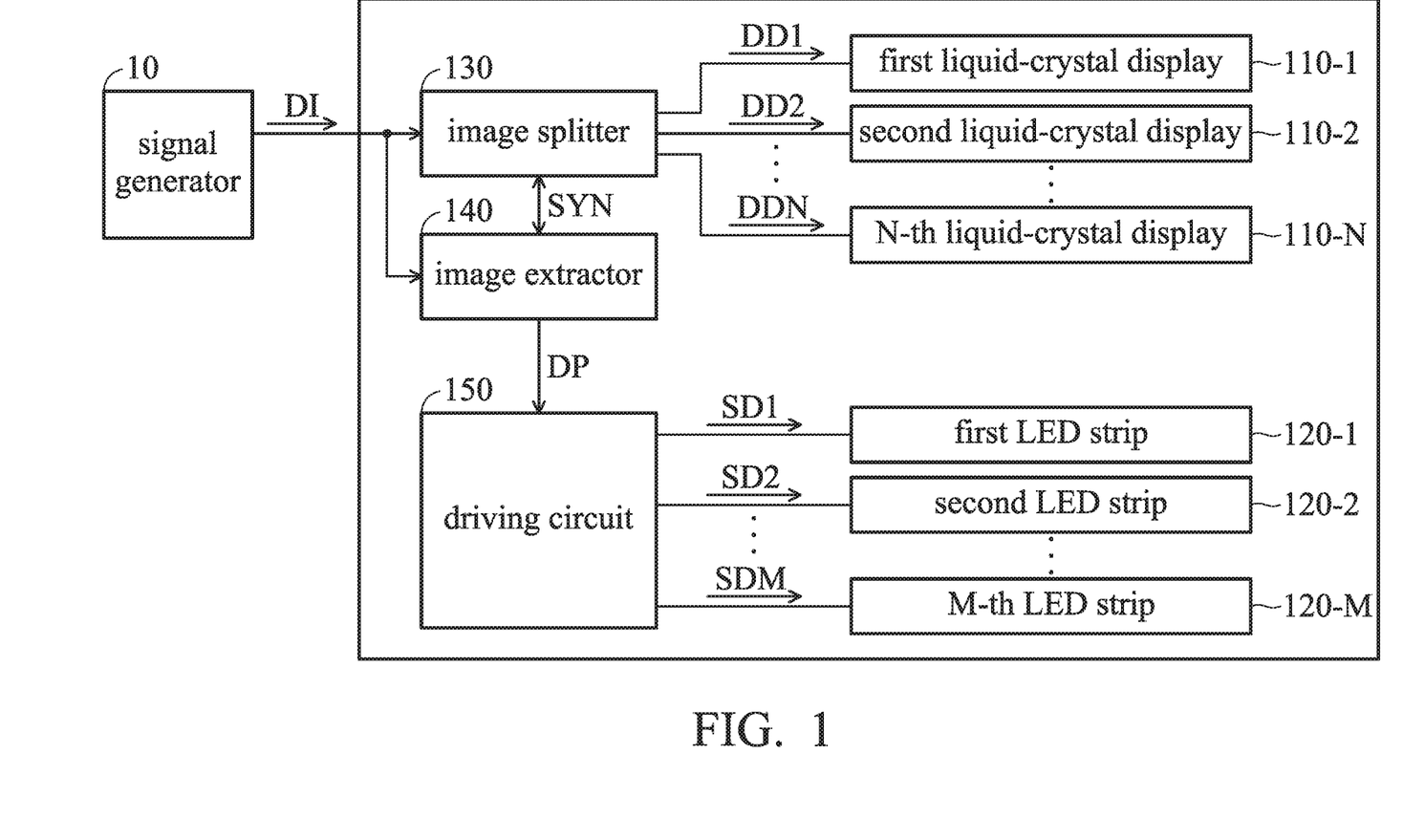
FIG. 1 is a block diagram of a display device in accordance with an embodiment of the invention.

FIG. 1 is a block diagram of a display device in accordance with an embodiment of the invention. As shown in FIG. 1, the display device 100 is configured to display the image data DI transmitted by the signal generator 10. According to some embodiments of the invention, the signal generator 10 may be various playback devices for playing images or pictures.

The display device 100 includes a first liquid-crystal display 110-1, a second liquid-crystal display 110-2, . . . , an N-th liquid-crystal display 110-N, a first LED strip 120-1, a second LED strip 120-2, . . . , an M-th LED strip 120-M, an image splitter 130, an image extractor 140, and a driving circuit 150.

The first liquid-crystal display 110-1, the second liquid-crystal display 110-2, ..., and the N-th liquid-crystal display 110-N are arranged in an array. The first LED strip 120-1, the second LED strip 120-2, ..., and the M-th LED strip 120-M are placed among the first liquid-crystal display 110-1, the second liquid-crystal display 110-2, ..., and the N-th liquid-crystal display 110-N. According to an embodiment of the invention, the first liquid-crystal display 110-1, the second liquid-crystal display 110-2, ..., the N-th liquid-crystal display 110-N, the first LED strip 120-1, the second LED strip 120-2, ..., and the M-th LED strip 120-M form a TV wall, which is configured to display the image data DI transmitted by the signal generator 10.

The image splitter 130 receives the image data DI, and splits the image data DI according to the locations of the first liquid-crystal display 110-1, the second liquid-crystal display 110-2, ..., and the N-th liquid-crystal display 110-N relative to one another to generate first split data DD1, a second split data DD2, ..., and the N-th split data DDN. The image splitter 130 further provides the first split data DD1, the second split data DD2, ..., and the N-th split data DDN to the first liquid-crystal display 110-1, the second liquid-crystal display 110-2, ..., and the N-th liquid-crystal display 110-N respectively.

The image extractor 140 extracts the patch data DP from the image data DI according to the locations of the first LED strip 120-1, the second LED strip 120-2, ..., and the M-th LED strip 120-M relative to one another, and transmits the patch data DP to the driving circuit 150. The driving circuit 150 generates a first driving signal SD1, a second driving signal SD2, ..., and an M-th driving signal SDM according to the patch data DP so as to drive the first LED strip 120-1, the second LED strip 120-2, ..., and the M-th LED strip 120-M respectively.

The image splitter 130 and the image extractor 140 are synchronized through an synchronization signal SYN so that the image splitter 130 and the image extractor 140 can simultaneously transmit the first split data DD1, the second split data DD2, ..., the N-th split data DDN, and the patch data DP to the liquid-crystal displays 110-1~110-N and the LED strips 120-1~120-M, for the sake of the TV wall formed by the liquid-crystal displays 110-1~110-N and the LED strips 120-1~120-M smoothly displaying the image data DI.

Figure 2:
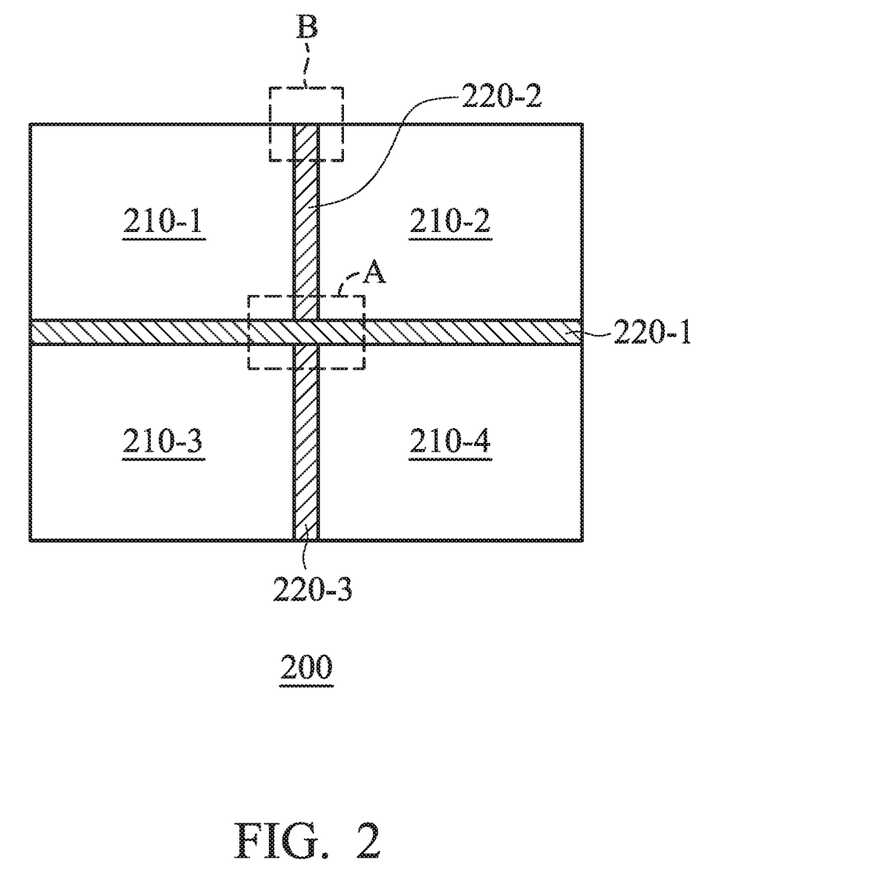
FIG. 2 is a schematic diagram of a TV wall in accordance with an embodiment of the invention.

FIG. 2 is a schematic diagram of a TV wall in accordance with an embodiment of the invention. As shown in FIG. 2, the TV wall 200 includes a first liquid-crystal display 210-1, a second liquid-crystal display 210-2, a third liquid-crystal display 210-3, a fourth liquid-crystal display 210-4, a first LED strip 220-1, a second LED strip 220-2, and a third LED strip 220-3.

As shown in FIG. 2, the first liquid-crystal display 210-1, the second liquid-crystal display 210-2, the third liquid-crystal display 210-3, and the fourth liquid-crystal display 210-4 are arranged in an array. The first LED strip 220-1, the second LED strip 220-2, and the third LED strip 220-3 are disposed among the first liquid-crystal display 210-1, the second liquid-crystal display 210-2, the third liquid-crystal display 210-3, and the fourth liquid-crystal display 210-4.

In other words, the first LED strip 220-1, the second LED strip 220-2, and the third LED strip 220-3 are configured to replace the frames in between the first liquid-crystal display 210-1, the second liquid-crystal display 210-2, the third liquid-crystal display 210-3, and the fourth liquid-crystal display 210-4 so that the TV wall 200 can display images continuously. In addition, the TV wall 200 includes four liquid-crystal displays and three LED strips, which is merely illustrated herein but not intended to be limited thereto.

According to an embodiment of the invention, the image splitter 110 in FIG. 1 splits the image data DI into the split data DD1~DDN according to the locations of the first liquid-crystal display 210-1, the second liquid-crystal display 210-2, the third liquid-crystal display 210-3, and the fourth liquid-crystal display 210-4 relative to the TV wall 200, and provides the split data DD1-DDN to the first liquid-crystal display 210-1, the second liquid-crystal display 210-2, the third liquid-crystal display 210-3, and the fourth liquid-crystal display 210-4 respectively. At the same time, the image extractor 140 extracts the patch data DP from the image data DI according to the locations of the first LED strip 220-1, the second LED strip 220-2, and the third LED strip 220-3 relative to the TV wall 200, and the driving circuit 150 drives the first LED strip 220-1, the second LED strip 220-2, and the third LED strip 220-3 respectively according to the patch data DP.

According to an embodiment of the invention, the image data DI are split into four equal parts, and each of the first liquid-crystal display 210-1, the second liquid-crystal display 210-2, the third liquid-crystal display 210-3, and the fourth liquid-crystal display 210-4 displays the corresponding split data. The first LED strip 220-1, the second LED strip 220-2, and the third LED strip 220-3 are configured to display the neighboring pixels of the neighboring liquid-crystal displays so as to cover the frames in between the first liquid-crystal display 210-1, the second liquid-crystal display 210-2, the third liquid-crystal display 210-3, and the fourth liquid-crystal display 210-4. Four liquid-crystal displays and three LED strips will be illustrated in the following paragraphs to explain how the TV wall 200 displays the image data DI.

Figure 3:
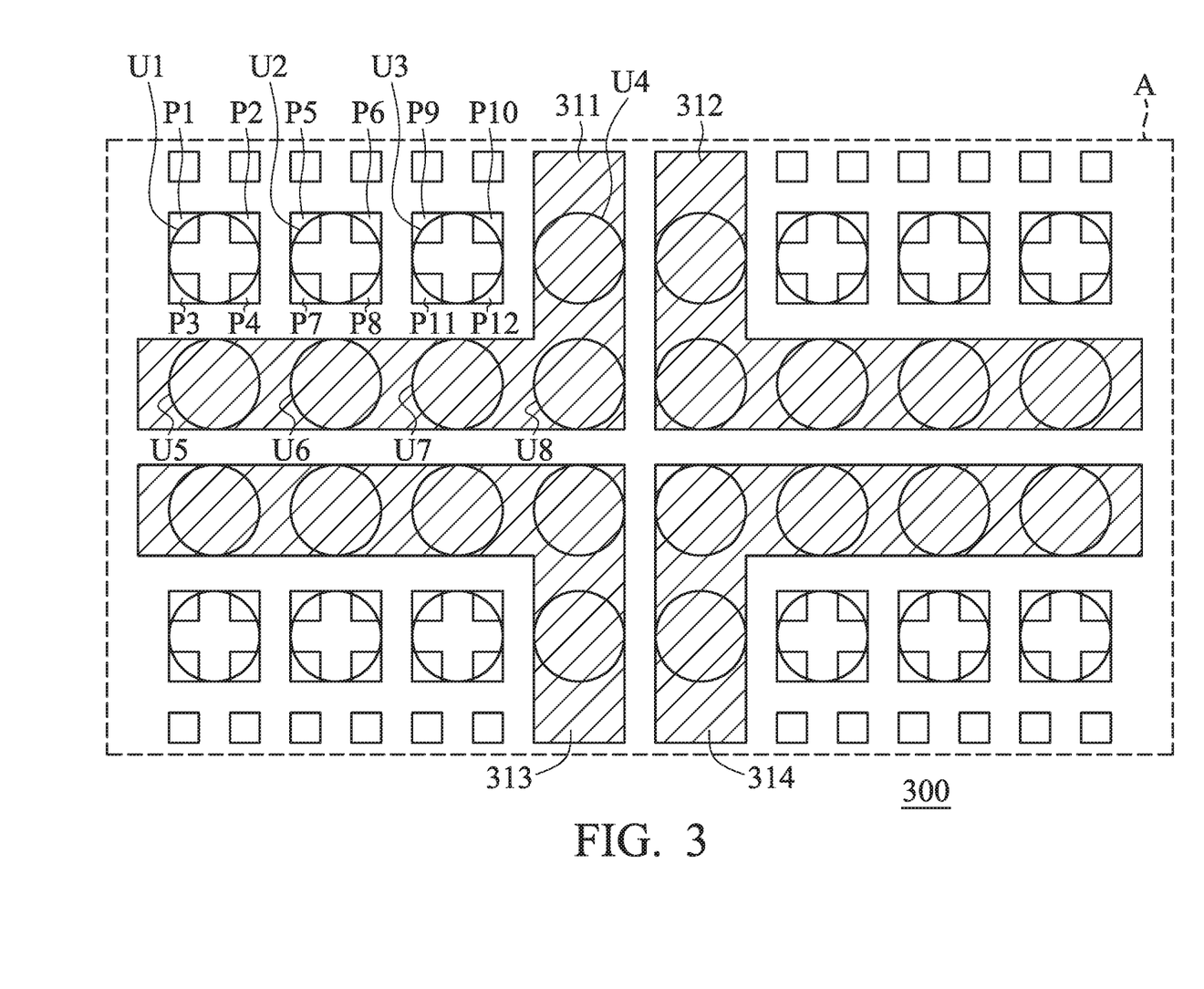
FIG. 3 is a schematic diagram of a TV wall in accordance with an embodiment of the invention.

FIG. 3 is a schematic diagram of a TV wall in accordance with an embodiment of the invention. As shown in FIG. 3, the TV wall 300 shows the enlarged first area A in FIG. 2. The first liquid-crystal device 210-1 in FIG. 2 is illustrated in the following paragraphs to describe how the LED strips display the patch data DP.

As shown in FIG. 3, the TV wall 300 includes a first frame 311 of the first liquid-crystal display 210-1, a second frame 312 of the second liquid-crystal display 210-2, a third frame 313 of the third liquid-crystal display 210-3, and a fourth frame 314 of the fourth liquid-crystal display 210-4. The first liquid-crystal display 210-1 includes a plurality of pixels P1-P12.

As shown in FIG. 3, the TV wall 300 includes a plurality of LED units U1-U8, in which the LED units U1-U3 cover the pixels P1-P12, and the LED units U4-U8 cover the first frame 311.

According to an embodiment of the invention, as shown in FIG. 3, the size of the LED units is 4-fold of that of the pixels in the liquid-crystal displays. According to another embodiment of the invention, the size of the LED units is equal to that of the pixels of the liquid-crystal displays. According to other embodiments of the invention, the size of the LED units can be any multiple of that of the pixels of the liquid-crystal displays. It is illustrated that the size of the LED unit U1-U8 is 4-fold of that of the pixels P1-P12 for explanation, but not intended to be limited thereto.

According to an embodiment of the invention, the LED units U1-U3 illuminate the average chromaticity of the covered pixels, and the LED units U5-U8 illuminate the average chromaticity of the neighboring pixels or the chromaticity of the adjacent pixel.

More specifically, the first LED unit U1 is configured to illuminate the average chromaticity of the pixels P1-P4. The second LED unit U2 is configured to illuminate the average chromaticity of the pixels P5-P8. The third LED unit U3 is configured to illuminate the average chromaticity of the pixels P9-P12. The fourth LED unit U4 is configured to illuminate the chromaticity of the pixel P10. The fifth LED unit U5 is configured to illuminate the average chromaticity of the pixel P3 and the pixel P4. The sixth LED unit U6 illuminates the average chromaticity of the pixel P7 and the pixel P8. The seventh LED unit U7 is configured to illuminate the chromaticity of the pixel P11. The LED unit U8 is configured to illuminate the chromaticity of the pixel P12.

According to another embodiment of the invention, the LED unit U1-U3 illuminate the average chromaticity of some covered pixels, and the LED units U5-U8 illuminate the average chromaticity of the neighboring pixels or the chromaticity of the adjacent pixel.

More specifically, the first LED unit U1 is configured to illuminate the average chromaticity of the pixel P1 and the pixel P2. The second LED unit U2 is configured to illuminate the average chromaticity of the pixel P5 and the pixel P6. The third LED unit U3 is configured to illuminate the chromaticity of the pixel P9. The fourth LED unit U4 is configured to illuminate the chromaticity of the pixel P10. The fifth LED unit U5 is configured to illuminate the average chromaticity of the pixel P3 and the pixel P4. The sixth LED unit U6 illuminates the average chromaticity of the pixel P7 and the pixel P8. The seventh LED unit U7 is configured to illuminate the chromaticity of the pixel P11. The LED unit U8 is configured to illuminate the chromaticity of the pixel P12.

Figure 4:
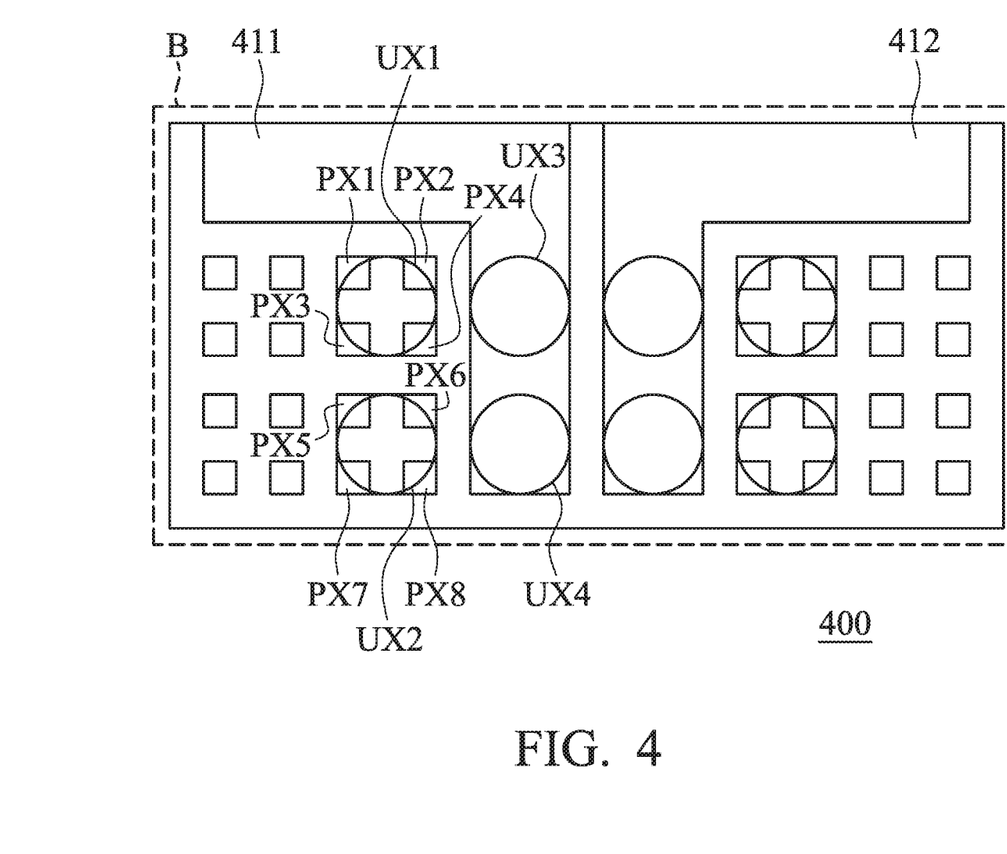
FIG. 4 is a schematic diagram of a TV wall in accordance with another embodiment of the invention.

FIG. 4 is a schematic diagram of a TV wall in accordance with another embodiment of the invention. As shown in FIG. 4, the TV wall 400 shows the enlarged second area B in FIG. 2. The first liquid-crystal display 210-1 in FIG. 2 is illustrated in the following paragraphs to explain how the LED strips illuminate the patch data DP.

As shown in FIG. 4, the TV wall 400 includes a first frame 411 and a second frame 412. The first frame 411 is the frame of the first liquid-crystal display 210-1 in FIG. 2. The second frame 412 is the frame of the second liquid-crystal display 210-2 in FIG. 2. The first liquid-crystal display 210-1 includes a plurality of pixels PX1-PX8.

As shown in FIG. 4, the TV wall 400 includes a plurality of LED units UX1-UX4. The LED units UX1-UX2 cover the pixels PX1-PX8. The LED units UX3-UX4 cover the first frame 411. It is illustrated that the size of the LED units UX1-UX4 is 4-fold of that of the pixels PX1-PX8 for explanation, but not intended to be limited thereto.

According to an embodiment of the invention, LED units UX1-UX2 illuminate the average chromaticity of its covered pixels, and the LED units UX3-UX4 illuminate the average chromaticity of the neighboring pixels.

More specifically, the first LED unit UX1 is configured to illuminate the average chromaticity of the pixel PX1 and the pixel PX3. The second LED unit UX2 is configured to illuminate the average chromaticity of the pixel PX5 and the pixel PX7. The third LED unit UX3 is configured to illuminate the average chromaticity of the pixel PX2 and the pixel PX4. The fourth LED unit UX4 is configured to illuminate the average chromaticity of the pixel PX6 and the pixel PX8.

Figure 5:
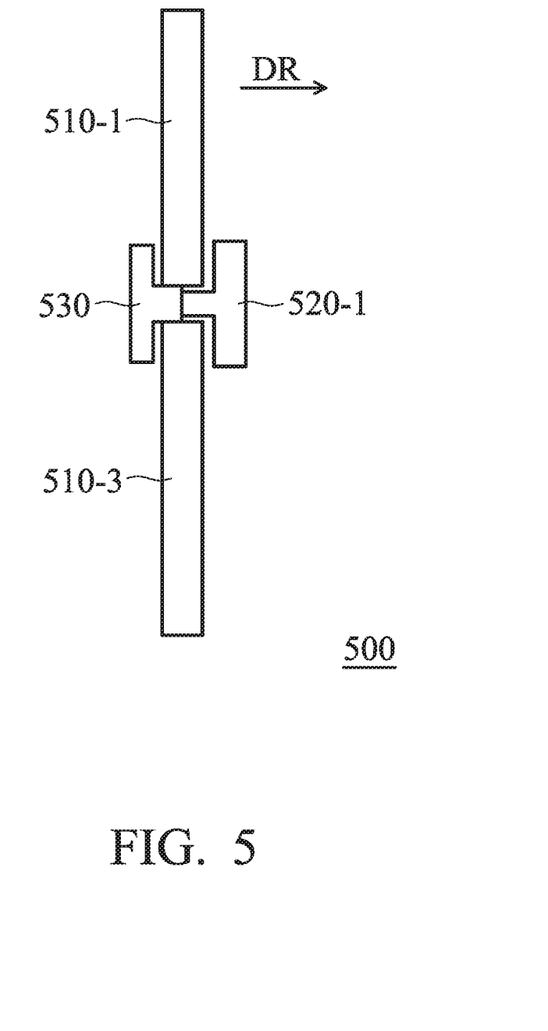
FIG. 5 is a side-view diagram of a TV wall in accordance with an embodiment of the invention.

FIG. 5 is a side-view diagram of a TV wall in accordance with an embodiment of the invention. As shown in FIG. 5, the TV wall 500 corresponds to the TV wall 200 in FIG. 2. The first liquid-crystal display 510-1 corresponds to the first liquid-crystal display 210-1 in FIG. 2. The third liquid-crystal display 510-3 corresponds to the third liquid-crystal display 210-3 in FIG. 2. The first LED strip 520-1 corresponds to the first LED strip 220-1 in FIG. 2.

As shown in FIG. 5, the display surface of the first liquid-crystal display 510-1, the third liquid-crystal display 510-3, and the first LED strip 520-1 faces the illumination direction DR. According to an embodiment of the invention, the driving circuit 530 is located at the back side of the TV wall 500, which is configured to engage with the first LED strip 520-1.

Figure 6:
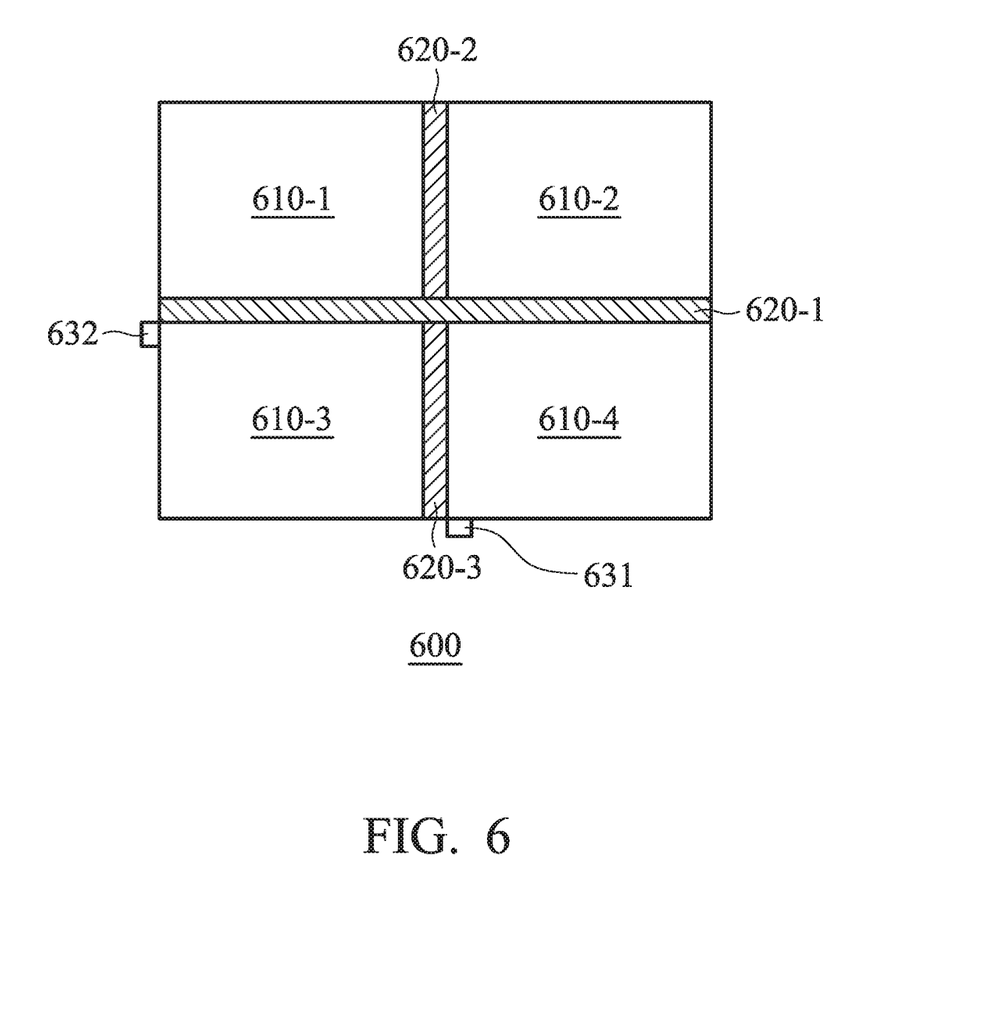
FIG. 6 is a schematic diagram of a TV wall in accordance with an embodiment of the invention.

FIG. 6 is a schematic diagram of a TV wall in accordance with an embodiment of the invention. As shown in FIG. 6, the TV wall 600 corresponds to the TV wall 200 in FIG. 2. A first liquid-crystal display 610-1, a second liquid-crystal display 610-2, a third liquid-crystal display 610-3, and the fourth liquid-crystal display 610-4 correspond to the first liquid-crystal display 210-1, the second liquid-crystal display 210-2, the third liquid-crystal display 210-3, and the fourth liquid-crystal display 210-4. A first LED strip 620-1 corresponds to the first LED strip 220-1 in FIG. 2. A second LED strip 620-2 corresponds to the second LED strip 220-2 in FIG. 2. A third LED strip 620-3 corresponds to the third LED strip 220-3 in FIG. 2.

As shown in FIG. 6, the TV wall 600 further includes a first driving circuit 631 and a second driving circuit 632. The first LED strip 620-1, the second LED strip 620-2, and the third LED strip 620-3 are engaged with the first driving circuit 631 and the second driving circuit 632 at the frame of the TV wall, so as to reduce the spacing among the first liquid-crystal display 610-1, the second liquid-crystal display 610-2, the third liquid-crystal display 610-3, and the liquid-crystal display 610-4.

According to an embodiment of the invention, the first driving circuit 631 is configured to drive the second LED strip 620-2 and the third LED strip 620-3, and the second driving circuit 632 is configured to drive the first LED strip 620-1. According to an embodiment of the invention, the first driving circuit 631 and the second driving circuit 632 correspond to the driving circuit 150 in FIG. 1.

Figure 7:
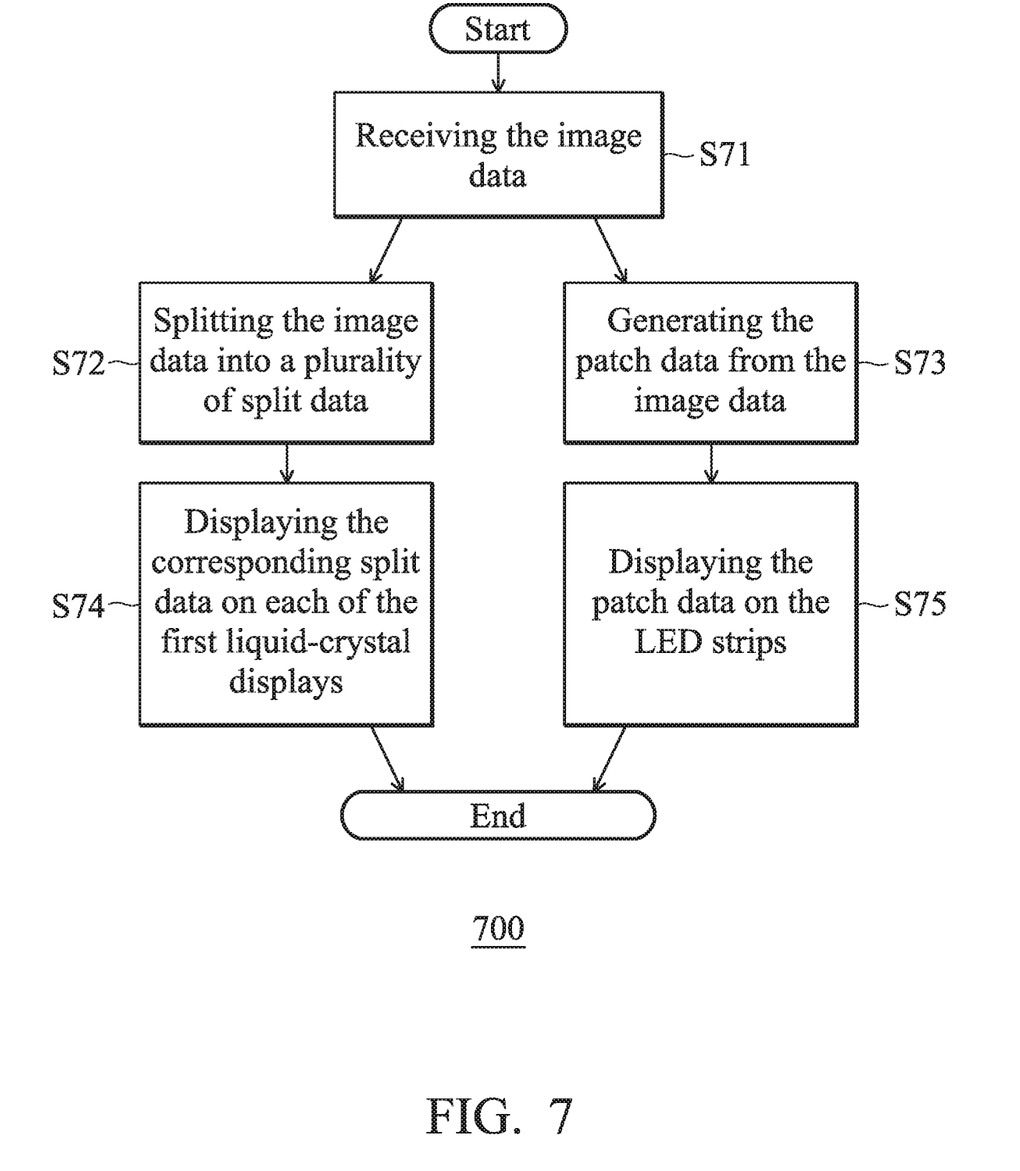
FIG. 7 is a flow chart of a display method in accordance with an embodiment of the invention.

FIG. 7 is a flow chart of a display method in accordance with an embodiment of the invention. The description of the display method 700 will be accompanied with the block diagram of FIG. 1 for the sake of detailed explanation. As shown in FIG. 7, the image data DI is received from the signal generator 10 (Step S71). The image data DI is split into a plurality of split data DD1~DDN by the image splitter 130 according to locations the first liquid-crystal display 110-1, the second liquid-crystal display 110-2, . . . , and the N-th liquid-crystal display 110-N relative to one another (Step S72). The patch data DP is generated from the image data DI by the image extractor 140 according to the locations of the first LED strip 120-1, the second LED strip 120-2, . . . , and the M-th LED strip 120-M relative to one another (Step S73). The method of generating the patch data DP is not repeated herein.

Then, the plurality of split data DD1~DDN are displayed by the first liquid-crystal display 110-1, the second liquid-crystal display 110-2, . . . , and the N-th liquid-crystal display 110-N(Step S74). In addition, the patch data DP is displayed by the first LED strip 120-1, the second LED strip 120-2, . . . , and the M-th LED strip 120-M (Step S75).

According to an embodiment of the invention, Step S74 and Step S75 are executed simultaneously so that a TV wall formed by the first liquid-crystal display 110-1, the second liquid-crystal display 110-2, . . . , the N-th liquid-crystal display 110-N, the first LED strip 120-1, the second LED strip 120-2, . . . , and the M-th LED strip 120-M can smoothly display the image data DI of the signal generator 10.

Display devices and display methods thereof are provided herein. A TV wall can therefore be formed by liquid-crystal displays having lower cost, and the gaps among the display screen of the liquid-crystal displays can be filled with the LED strips. In addition, the display methods provided herein can also allow the TV wall, which is formed by a plurality of liquid-crystal displays and a plurality of LED strips, to smoothly play videos and pictures.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display device, comprising:
   a plurality of liquid-crystal displays, wherein each of the liquid-crystal displays displays corresponding split data;
   a plurality of LED strips, disposed among the liquid-crystal displays, wherein each of the LED strips displays patch data according to a corresponding driving signal, wherein the liquid-crystal displays and the LED strips form a TV wall, and the TV wall displays image data;
   an image splitter, splitting the image data to generate the split data;
   an image extractor, generating the patch data according to the image data; and
   a driving circuit, generating the driving signals according to the patch data, wherein the image extractor extracts the patch data from the image data according to locations of the LED strips relative to the TV wall, and the driving circuit drives the LED strips according to the patch data, wherein each of the liquid-crystal displays comprises a plurality of first pixels and a plurality of second pixels, and the LED strips comprise a plurality of LED units, wherein the second pixels enclose the first pixels, and the second pixels neighbor the LED units, wherein each of the LED units illuminates an average chromaticity of the neighboring second pixels.

2. The display device of claim 1, wherein the image splitter and the image extractor receive the image data from a signal generator.

3. The display device of claim 1, wherein the image splitter splits the image data according to locations of the liquid-crystal displays relative to the TV wall to generate the split data, and provides the split data to the corresponding liquid-crystal displays.

4. The display device of claim 1, wherein the image splitter is synchronized with the image extractor so that the liquid-crystal displays and the LED strips synchronously display the image data.

5. A display device, comprising:
   a plurality of liquid-crystal displays, wherein each of the liquid-crystal displays displays corresponding split data;
   a plurality of LED strips, disposed among the liquid-crystal displays, wherein each of the LED strips displays patch data according to a corresponding driving signal, wherein the liquid-crystal displays and the LED strips form a TV wall, and the TV wall displays image data;
   an image splitter, splitting the image data to generate the split data;
   an image extractor, generating the patch data according to the image data; and
   a driving circuit, generating the driving signals according to the patch data, wherein the image extractor extracts the patch data from the image data according to locations of the LED strips relative to the TV wall, and the driving circuit drives the LED strips according to the patch data, wherein each of the liquid-crystal displays comprises a plurality of first pixels and a plurality of second pixels, and the LED strips comprise a plurality of first LED units and a plurality of second LED units, wherein the second pixels enclose the first pixels, wherein the second LED units cover the second pixels, and the second pixels neighbor the first LED units, wherein each of the first LED units illuminates an average chromaticity of the neighboring second pixels, wherein each of the second LED units illuminates the average chromaticity of the covered second pixels.

6. A display method, adapted to a TV wall, wherein the TV wall is formed by a plurality of liquid-crystal displays and a plurality of LED strips, wherein the LED strips are disposed among the liquid-crystal displays, wherein the display method comprises:
   receiving image data;
   splitting the image data to generate split data;
   displaying the corresponding split data on the liquid-crystal displays;
   generating the patch data according to the image data, wherein the step of generating the patch data according to the image data further comprises:
   extracting the patch data from the image data according to locations of the LED strips relative to the TV wall; and
   driving the LED strips according to the patch data; and
   displaying the patch data on the LED strips, wherein each of the liquid-crystal displays comprises a plurality of first pixels and a plurality of second pixels, and the LED strips comprise a plurality of LED units, wherein the second pixels enclose the first pixels, and the second pixels neighbor the LED units, wherein the step of generating the patch data according to the image data further comprises:
   illuminating an average chromaticity of the neighboring second pixels by the LED units.

7. The display method of claim 6, wherein the image data is generated by a signal generator.

8. The display method of claim 6, wherein the step of splitting the image data to generate the split data further comprises:

splitting the image data to generate the split data according to locations of the liquid-crystal displays relative to the TV wall; and providing the split data to the corresponding liquid-crystal displays.

9. The display method of claim 6, wherein the step of displaying the corresponding split data on the liquid-crystal displays and the step of displaying the patch data on the LED strips are executed simultaneously so that the liquid-crystal display and the LED strips simultaneously display the image data.

10. A display method, adapted to a TV wall, wherein the TV wall is formed by a plurality of liquid-crystal displays and a plurality of LED strips, wherein the LED strips are disposed among the liquid-crystal displays, wherein the display method comprises:

receiving image data;

splitting the image data to generate split data;

displaying the corresponding split data on the liquid-crystal displays;

generating the patch data according to the image data, wherein the step of generating the patch data according to the image data further comprises:

extracting the patch data from the image data according to locations of the LED strips relative to the TV wall; and driving the LED strips according to the patch data; and displaying the patch data on the LED strips, wherein each of the liquid-crystal displays comprises a plurality of first pixels and a plurality of second pixels, and the LED strips comprise a plurality of first LED units and a plurality of second LED units, wherein the second pixels enclose the first pixels, wherein the second LED units cover the second pixels, and the second pixels neighbor the first LED units, wherein the step of generating the patch data according to the image data further comprises:

illuminating an average chromaticity of the neighboring second pixels by the first LED units; and illuminating an average chromaticity of the covered second pixels by the second LED units.

* * * * *